UNITED STATES PATENT OFFICE.

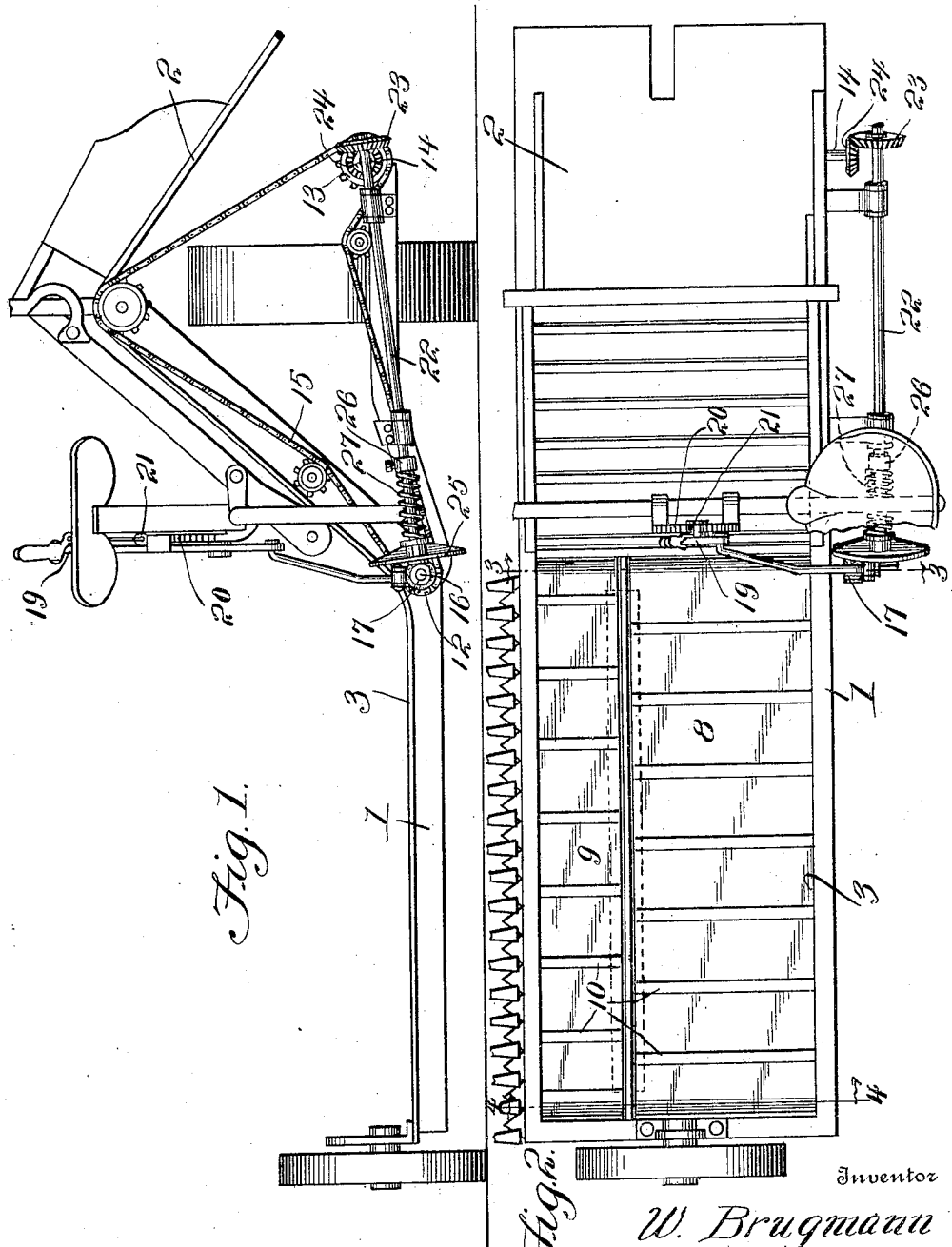

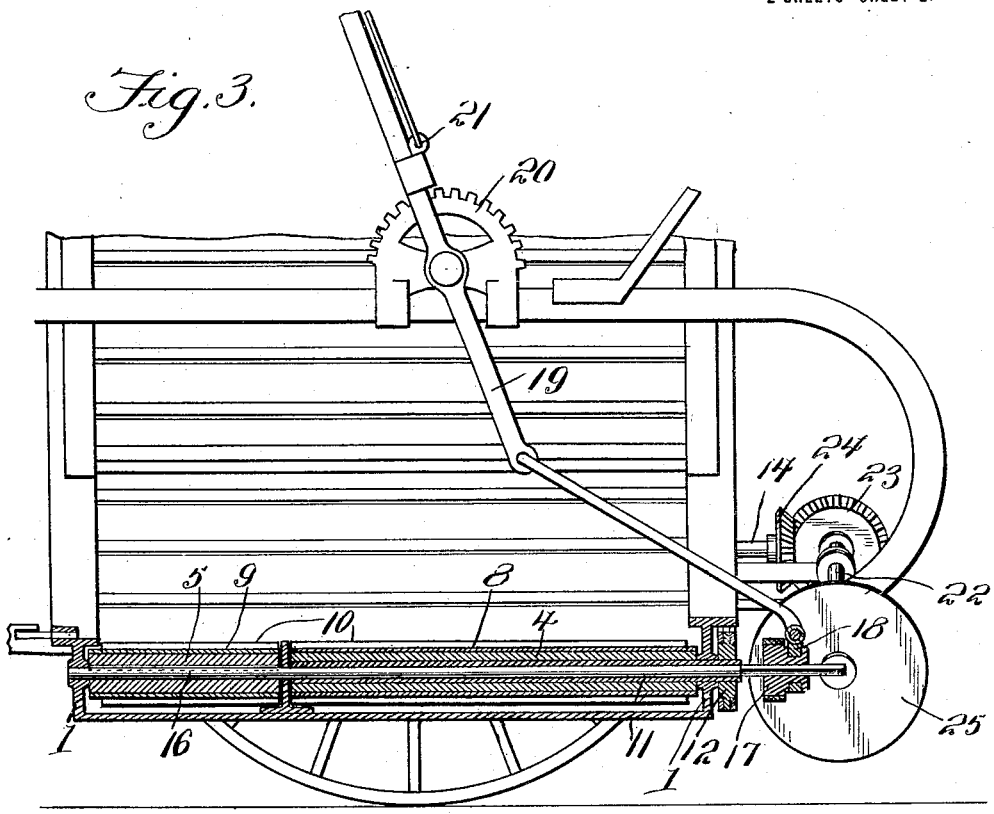

WALTER BRUGMANN, OF DAVENPORT, IOWA.

CANVAS PLATFORM FOR BINDERS.

1,212,011. Specification of Letters Patent. Patented Jan. 9, 1917.

Application filed December 4, 1915. Serial No. 65,118.

*To all whom it may concern:*

Be it known that I, WALTER BRUGMANN, a citizen of the United States, residing at Davenport, in the county of Scott and State of Iowa, have invented new and useful Improvements in Canvas Platforms for Binders, of which the following is a specification.

This invention relates to grain conveyers for binders and it consists in the novel features hereinafter described and claimed.

In binders now generally used the grain which is cut and deposited upon the conveyer of the grain table frequently gets out of alinement or assumes slanting position as it is delivered to the grain deck and this results in the loss of grain and renders the bundles rough and irregular.

It is an object of the present invention to overcome this objection and in doing so the conveyer belt is made in two sections with means for moving the sections at different rates of speed. The forward belt section moves at a more rapid rate of speed than the rear belt section and this has the effect of presenting the grain to the grain deck in proper alinement or position. One reason why the single belt does not properly present the grain is that there is greater frictional contact between the grain and the belt at the heads of the grain owing to the fact that the heads are heavier than the cut ends of the stems. Therefore there is greater friction between the heads and the belts than between the butts of the stems and the belt sometimes slips under the butts but carries the head ends along and this destroys the proper alinement of the grain stems when the stems are delivered to the deck. By reason of the fact that in the present invention the forward section of the grain belt moves at a greater rate of speed than the rear section any slip that occurs between the belt section and the butt ends of the stems is compensated for by the greater rate of speed at which the forward section is traveling and therefore the grain is presented to the grain deck in a desired manner.

The roller at the delivery end of the grain table is made in two sections which rotate about a common axis. Means is provided for rotating the innermost or rear roller at one rate of speed and other means is provided for rotating the forward or outermost rollers at a faster rate of speed. Both of these means are operated from a single shaft of the binder which in turn is rotated by any of the movable parts of the binder in the usual manner.

In the accompanying drawings: Figure 1 is a rear end elevation of a binder with the grain conveyer attached. Fig. 2 is a top plan view of the same. Fig. 3 is a transverse sectional view of the same cut on the line 3—3 of Fig. 2. Fig. 4 is a similar view cut on the line 4—4 of Fig. 2. Fig. 5 is a detail sectional view of the intermediate portion of the conveyer.

As illustrated in the accompanying drawing the frame 1 is a portion of the frame usually employed upon grain harvesters. A grain deck 2 is supported upon the frame in the usual manner as is also a grain table 3. Roller sections 4 and 5 are journaled for rotation at the inner edge of the grain table 3 and the said roller sections are in longitudinal alinement with each other and are of the same diameter. Roller sections 6 and 7 are similarly journaled at the outer edge of the grain table 3.

A belt section 8 is trained around the rollers 4 and 6 and a belt section 9 is trained around the rollers 5 and 7. The said belt sections are provided with suitable cross slats 10. The roller section 4 is provided at one end with a sleeve 11 and the said section is hollow throughout its length. A sprocket wheel 12 is fixed to the sleeve 11 beyond the rear edge of the grain table 3 and a sprocket wheel 13 is fixed to a shaft 14 journaled upon the frame 1 and which may be rotated by any moving part of the binder. A sprocket chain 15 is trained around the sprocket wheels 12 and 13 and is adapted to transmit rotary movement from the shaft 14 to the roller section 6 at one rate of speed. The roller section 5 is mounted upon a shaft 16 which traverses the length of the roller section 6 and passes through the sleeve 11 thereof and extends beyond the rear end of the same. A wheel 17 is slidably mounted upon the rear end of the shaft 16 but the shaft 16 is constrained to rotate in unison with the wheel 17. A claw member 18 receives the wheel 17 and is operatively connected with a lever 19 fulcrumed upon the frame 1 of the binder. A dentate segment 20 is mounted upon the frame 1 adjacent the lever 19 and the said lever is provided with a spring pawl 21 adapted to engage the teeth of the segment 20 whereby the lever 19 is held at an adjusted position.

A shaft 22 is journaled behind the shaft 14 and is disposed at a right angle thereto. A beveled gear wheel 23 is carried by the shaft 22 and meshes with a similar wheel 24 mounted at the rear end of the shaft 14. A disk 25 is slidably mounted upon the shaft 22 adjacent the wheel 17 but the said disk 25 is constrained to rotate in unison with the said shaft 22. A collar 26 is mounted upon the shaft 22 and a coiled spring 27 is interposed between the said collar and the said disk 25 and is under tension with a tendency to hold the disk in frictional contact with the periphery of the wheel 17.

From the above description taken in conjunction with the accompanying drawing it will be seen that as the shaft 14 rotates rotary movement is transmitted by the chain 15 to the roller section 6. At the same time rotary movement is transmitted from the shaft 14 to the intermeshing gear wheels 23 and 24 to the shaft 22 and inasmuch as the disk 25 is mounted to rotate with the shaft 22 the said disk is rotated. In view of the fact that the disk 25 has frictional contact with the periphery of the wheel 17 and the said wheel is mounted upon the shaft 16 in a manner as indicated the said shaft is rotated in the roller section 6 whereby the roller section 5 at the forward end of the roller section 6 is also rotated. By shifting the wheel 17 toward or away from the center of the disk 25 the shaft 16 may be caused to rotate fast or slow and consequently the roller section 5 is rotated at a different rate of speed from the roller section 6. In actual operation the roller section 5 is rotated at a faster rate of speed than the roller section 6 consequently the belt section 9 is moved at a greater rate of speed than the belt section 8. As the grain is cut and falls upon the upper runs of the belt sections 8 and 9 it is carried toward the grain deck 2 and in view of the fact that the belt section 9 is moving at a greater rate of speed than the belt section 8 the butt ends of the stems of grain are presented to the grain deck 2 substantially at the same time that the head ends of the grain stems are presented consequently the grain is presented to the said grain deck in desired position or alinement. The grain is carried up over the deck in the usual manner and down and in view of the fact that the stems of grain are presented to the deck in proper alinement the resulting bundles are smooth and even. By shifting the wheel 17 with relation to the disk 25 the rate of speed at which the forward belt section 9 moves with relation to the rear belt section may be regulated in order to cause the device to present the grain in proper position if the heads of the grain are excessively heavy or extremely light.

From the foregoing description taken in conjunction with the accompanying drawing it will be seen that a grain conveyer of simple and durable structural arrangement is provided and that the parts may be manipulated to cause the conveyer to deliver the grain to a grain deck or other part of the binder in proper condition or position.

Having described the invention what is claimed is:—

In combination with a grain deck, a sleeve journaled thereon, a roller fixed to the sleeve, a belt section trained around said roller, means for rotating the sleeve at one rate of speed, a disk operatively connected with said rotating means, a shaft journaled in the sleeve, a roller fixed to the shaft, a belt section trained around the last mentioned roller, and a wheel slidably mounted on the shaft and constrained to rotate the same and frictionally engaging the disk.

In testimony whereof I affix my signature.

WALTER BRUGMANN.